No. 661,070. Patented Nov. 6, 1900.
R. E. OLDS.
CLUTCH MECHANISM.
(Application filed Nov. 27, 1899.)
(No Model.) 3 Sheets—Sheet 1.
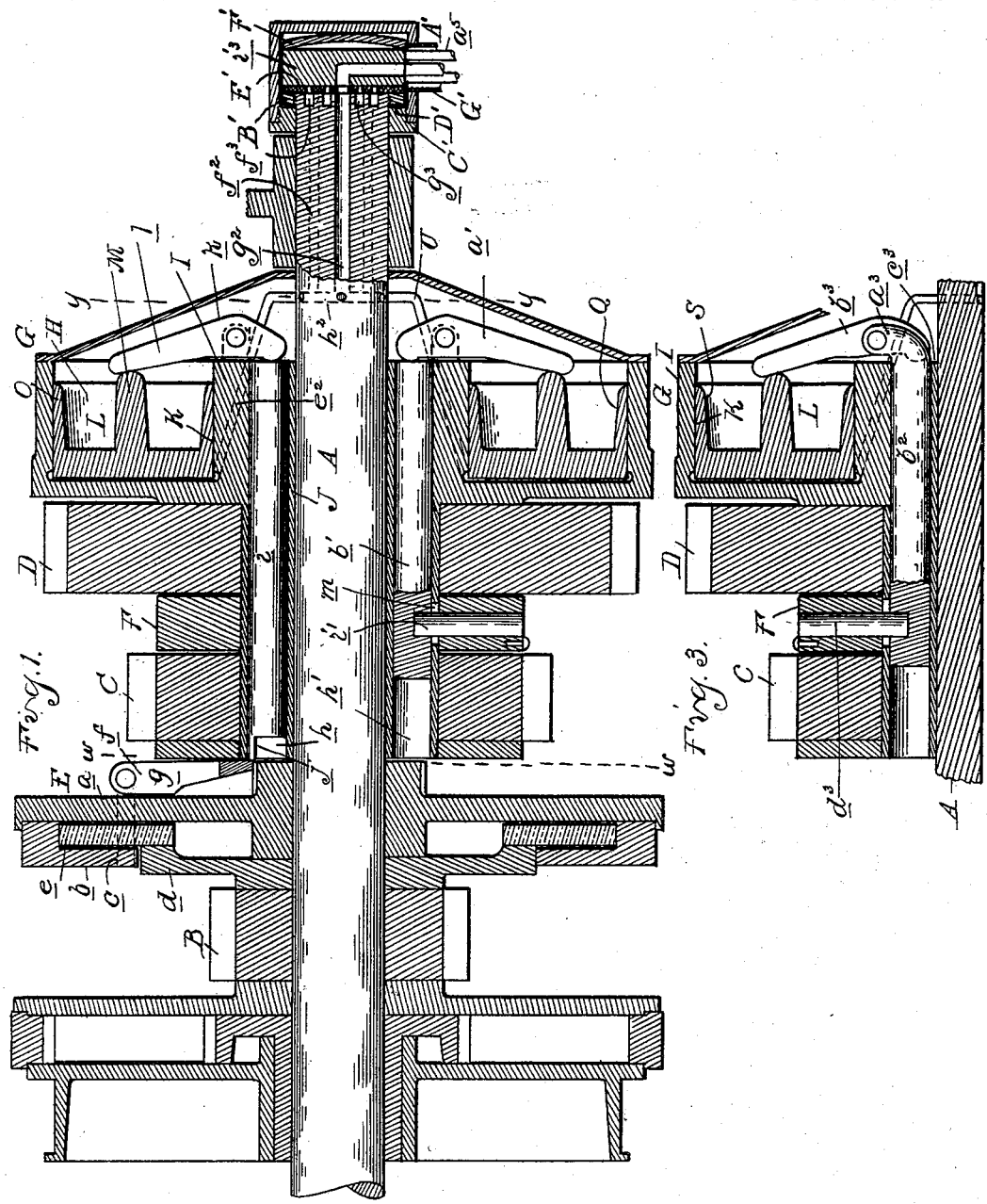

No. 661,070.  
R. E. OLDS.  
CLUTCH MECHANISM.  
(Application filed Nov. 27, 1899.)
(No Model.)
Patented Nov. 6, 1900.
3 Sheets—Sheet 2.
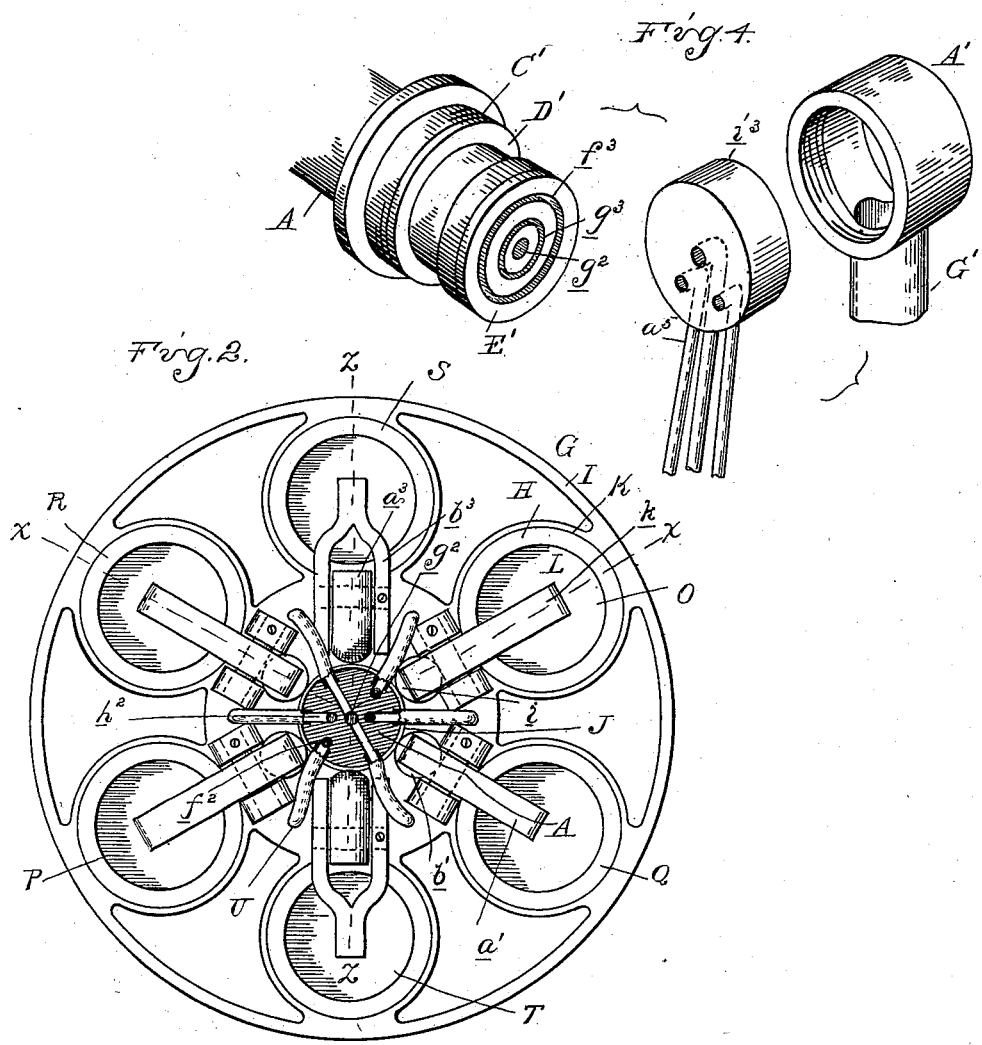

No. 661,070. Patented Nov. 6, 1900.
R. E. OLDS.
CLUTCH MECHANISM.
(Application filed Nov. 27, 1899.)
(No Model.) 3 Sheets—Sheet 3.
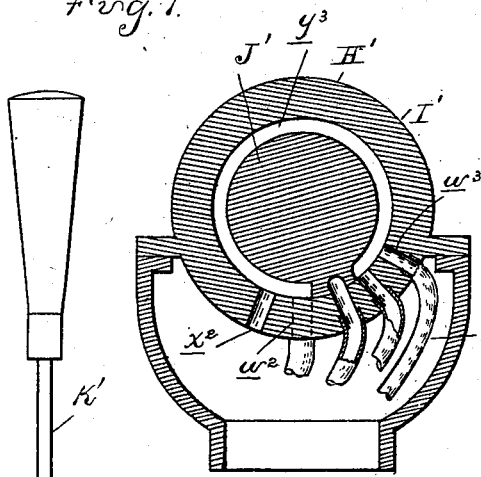
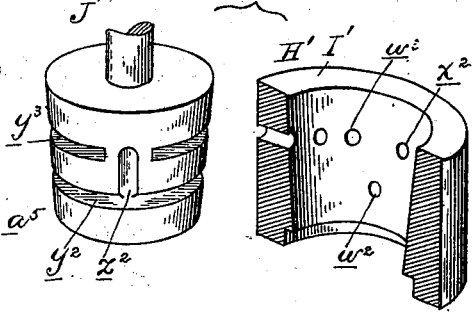
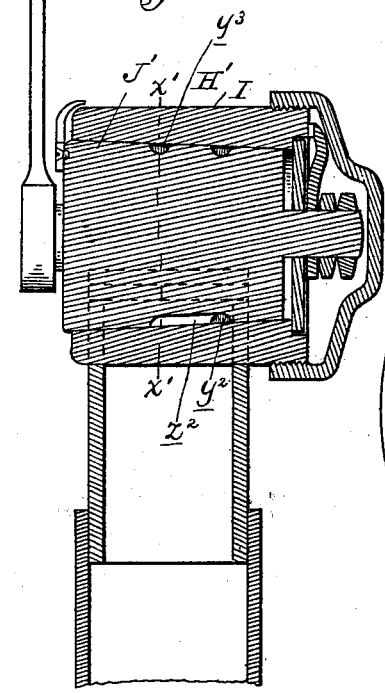
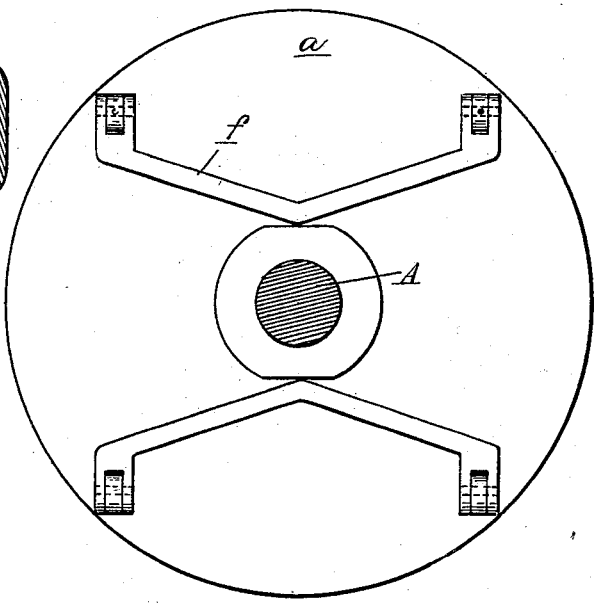
Witnesses
H. C. Smith
M. M. Dougherty
Inventor
Ransom E. Olds
By Thos. S. Sprague & Son.
Attys.

UNITED STATES PATENT OFFICE.

RANSOM E. OLDS, OF DETROIT, MICHIGAN.

CLUTCH MECHANISM.

SPECIFICATION forming part of Letters Patent No. 661,070, dated November 6, 1900.

Application filed November 27, 1899. Serial No. 738,461. (No model.)

*To all whom it may concern:*

Be it known that I, RANSOM E. OLDS, a citizen of the United States, residing at Detroit, in the county of Wayne and State of Michigan, have invented certain new and useful Improvements in Clutch Mechanism, of which the following is a specification, reference being had therein to the accompanying drawings.

The invention relates generally to clutches, and has particular reference to a clutch mechanism designed for use where a muitlple of members to be driven are loosely mounted for independent rotary movement on a single driving-shaft.

The invention consists in the novel formation of the clutch mechanism whereby any one of the several members may be secured to the shaft for rotary movement and in the peculiar arrangement and combination of the various parts of the mechanism, as will be more fully hereinafter described, and shown in the drawings, in which—

Figure 1 is a section taken on line $xx$, Fig. 2. Fig. 2 is a section on line $y\ y$, Fig. 1. Fig. 3 is a section on line $z\ z$ of Fig. 2. Fig. 4 is a perspective view of one end of the drive-shaft, showing the peculiar construction of the same and of the coupling, the members of the latter being detached. Fig. 5 is a section taken on line $w\ w$, Fig. 1. Fig. 6 is a vertical central section through the controlling-valve. Fig. 7 is a section on line $x\ x$, Fig. 6; and Fig. 8 is a sectional perspective view of the parts detached.

The reference-letter A designates the drive-shaft, on which are loosely mounted for independent movement members B, C, and D, the said members being in this particular case gear-wheels and preferably three in number.

E designates a clutch carried by the shaft intermediate the members B and C, adapted to be engaged with the member B.

F is a second clutch mounted upon the shaft between the members C and D, the said clutch being secured against rotary movement independent of the shaft and being capable of longitudinal movement to permit of its engagement with either of the members referred to.

G designates a support fixedly secured to the shaft, and located upon this support are a series of motors, such as H, for operating the clutches. The support referred to comprises a circular head I and an elongated hub J, as plainly shown in Fig. 1, and the members C and D and also the clutch F are shown as mounted upon this hub. The head has formed therein a series of recesses, such as K, constituting the motor-cylinders, the latter being six in number and arranged in pairs diametrically opposite each other.

L designates the motor-pistons, preferably cup-shaped in configuration, each being provided with a stem or pin M, projecting centrally therefrom. The piston-motors described are adapted to operate in pairs, two diametrically opposite motors being connected in the manner hereinafter set forth to the clutch that they are adapted to operate.

The clutch E, above referred to, comprises in its construction three members, one member (designated by the reference-letter $a$) being in the form of a disk and fixedly secured to the shaft, a second or movable member $b$, carried by the member $a$ and secured to the latter by means of bolts or pins $c$, and a third member $d$, which is carried by the gear-wheel B and is provided with a friction-disk $e$, adapted to extend between the first and second members of the clutch. The pins $c$ are four in number, arranged in pairs on opposite sides of the shaft, and are fixedly secured to the member $b$. These pins extend through apertures in the clutch member $a$ and carry at their free ends the levers $f$. The levers are preferably yoke-shaped in configuration and are provided with bifurcated ends which engage upon opposite sides of the pins, as shown in Fig. 5. These levers are also provided with bearings, such as $g$, which when the clutch is operated fulcrum upon the clutch member $a$, thus binding the gear-wheel B to the shaft.

The clutch just described is operated by means of the oppositely-arranged motors O and P, and the operative connections between these motors and the clutch are of the following construction: Within the elongated hub J are formed two longitudinal bores $h$, extending entirely through the hub and through the head I. Within each of these bores is arranged a bar or rod $i$, extending from the outer end of each cylinder to the clutch, the end of the rod adjacent to the clutch being provided with a finger $j$, which is adapted to bear against the lever $f$. Pivoted in the path of each of the two piston-motors is a lever of the first class $k$, one arm $l$ of which is adapted to bear against the stud or pin M of the piston and the complementary arm against the outer end of the rod $i$. Upon the motor being actuated the movement of the piston outwardly actuates the levers $k$ and $f$, and thereby operates the clutch, causing the member B to be secured to the shaft. The clutch F, located, as before stated, upon the elongated hub, is provided with the pins $l'$, which are adapted to project within recesses $m$, formed in the hub, whereby the clutch is prevented from rotary movement independent of the shaft, but is capable of lateral movement in either direction. When it is desired to engage the member C with the shaft, the clutch is moved into frictional engagement with said member, and the member D may be engaged with the clutch in a similar manner by the movement of the latter in an opposite direction.

The motors adapted to operate the clutch in the direction of the member C are designated by the reference-letters Q and R and for moving the clutch in the opposite direction by the letters S and T. The operative connections between the motors Q and R and the clutch are similar to the connections described, the head having formed therein similar bores $h'$ beneath the motors and rods similar to those described sliding therein, the rods in turn being actuated by means of levers similar to the levers $k'$, pivoted in the manner described in the path of the motor-pistons. In Fig. 1 the particular construction is shown, the levers being designated by the reference-letters $a'$ and the bars which are operated by the reference-letters $b'$. Two of the pins $l$, carried by the clutch, have their inner ends fixedly secured to the operating-bar $b'$, so that upon the operation of the motor the clutch will be moved laterally into engagement with the member that is to be secured to the shaft. To engage the member D, a mechanism similar to that already described is employed, with the exception that the lever that is operated by the motor-piston is of the second class, the actuation of said lever drawing the clutch in the desired direction.

The particular construction of the operating connections between the motors S and T and the clutch F is shown in Fig. 3. In this construction the operating-bars $b^2$ extend beyond the outer ends of the cylinders and are provided with upwardly-turned portions $a^3$. The lever designated by the reference-letter $b^3$ is pivoted to the extreme end of the upwardly-turned portion and is fulcrumed upon the supporting-head at the point $c^3$, the opposite end of the lever being arranged in the usual manner in the path of the motor-piston. Pins $d^3$ connect the clutch to the actuating-bars in the manner before described.

The motors are preferably, though not necessarily, fluid-motors and have a fluid-supply conveyed to them in the manner hereinafter set forth, the fluid passing, preferably, through a portion of the shaft before reaching the motors. Each motor is provided with a port, such as $e^2$, formed in the casting constituting the head, leading from the interior of the motor-chamber back of the piston to the front of the motor-support. The shaft at one end is provided with a multiple of longitudinal bores, preferably four in number, such as $f^2$, and a central bore $g^2$, and each of these bores is in turn provided with a transverse bore $h^2$, leading to the periphery of the shaft. The central bore is provided with two transverse bores diametrically arranged. These six cross or transverse bores which constitute inlet-ports for the fluid are connected, by means of suitable conduits U, to the several motor-ports formed in the casing, as plainly shown in Fig. 2. In the face of the shaft end are formed two circular grooves $f^3$ and $g^3$, constituting inlet-ports for two pairs of bores, and consequently for two pairs of motors. $i^3$ represents a stationary block held against the shaft end and provided with three L-shaped bores extending from the meeting face to substantially the center of the block and then at right angles to and through the block-periphery. These bores communicate with the two circular grooves and with the central bore in the shaft and receive a fluid-supply through conduits $a^5$, which are attached to the block in any suitable manner, so as to communicate with the L-shaped ports formed therein. From the description thus far given it will be readily seen that a fluid-supply through any one of the three conduits will be delivered simultaneously to one pair of oppositely-arranged motors and that any clutch may be operated, through its respective pair of motors, by selecting the conduit which communicates with these motors and conducting therethrough the necessary motive agent. The block just described, to which the conduits are attached, is held in place to the shaft by means of a coupling A', the construction of which and the manner in which it is secured to the shaft will be now described.

Upon the end of the shaft is secured the collar B'. The coupling, which is in the form of a cap, is adapted to be engaged over this collar and is prevented from endwise movement away from the shaft by means of a similar collar C'. D' designates a packing interposed between the two collars, and E' is a similar packing interposed between the shaft-collar and the block, which is carried within the cap. This latter packing is apertured to correspond with the apertures in the block, and the latter is held tightly against the shaft by means of the spring F'. This spring likewise acts to make a tight joint between the two collars. The coupling or cap is provided with a tube G', which communicates with the cap, and through this tube the several conduits $a^5$ extend.

It will be obvious from the construction of the mechanism that a single valve might be employed for controlling the supply of fluid for each conduit. As a matter of preference I employ a single controlling device, however, for the several conduits, which is in the form of a plug-valve H', the construction of which is shown in Figs. 6, 7, and 8. The valve consists of a casing I' and the plug J' therein, and K' designates the lever or handle for operating the plug. Within the casing is formed an inlet-port $w^2$ and above said port a series of outlet-ports $w^3$, the series being three in number, corresponding to the conduit-pipe $a^5$, which are attached thereto. $x^2$ designates the exhaust-port, arranged above the inlet-port in line with the several outlet-ports $w^3$. The valve-plug is provided with a circular groove $y^2$ and a transverse groove $y^3$, communicating with the circular groove. Above said circular groove is a somewhat-similar recess $z^2$, the ends of which approach but do not communicate with the transverse groove $y^3$. The circular groove $y^2$ is always in communication with the inlet-port within the valve-casing, and the transverse groove $y^3$ is adapted to communicate with one of the series of three outlet-ports $w^3$. The groove $z^2$ connects the exhaust-port in the casing with the outlet-ports that are not in use. Thus when it is desired to operate any particular clutch the operator is merely required to turn the valve in such manner as to allow a fluid-supply to enter the particular operating-motors, and as only one operating device is employed considerable time may be saved in the manipulation of the clutches.

What I claim as my invention is—

1. In a clutch mechanism, the combination with a shaft, a multiple of members to be driven loosely sleeved thereon, clutches for the members mounted upon the shaft for longitudinal movement, a disk fixed to the shaft, a multiple of independent fluid-motors for operating the clutches arranged upon the disk, operative connections between each of the motors and its respective clutch, a fluid-supply, and conduits leading from said supply to the motors.

2. In a clutch mechanism, the combination with a shaft, a multiple of members to be driven loosely sleeved thereon, clutches for the members mounted upon the shaft for longitudinal movement, a disk fixed upon the shaft, a series of pneumatic piston-motors secured upon the disk, the motors being arranged in pairs, one for each clutch, operating connections between each clutch and its respective pair of motors, a fluid-supply, and conduits leading from said supply and extending through the shaft to the motors.

3. In a clutch mechanism, the combination with the shaft, a multiple of members to be driven loosely sleeved thereon, clutches for the members mounted upon the shaft for longitudinal movement, a disk fixed to the shaft, a series of pairs of pneumatic piston-motors secured upon the disk, the motors of each pair being arranged diametrically opposite each other, a lever for each motor fulcrumed upon the disk in the path of the motor-piston, connecting-bars slidingly engaging the shaft and extending from the levers to the clutches to be operated, an air-supply, and a valve-controlled air-conduit leading from said supply to each motor and extending through the shaft.

4. In a clutch mechanism, the combination with a shaft having a multiple of longitudinal bores formed therein, a multiple of members to be driven loosely sleeved upon the shaft, a clutch for each member, a multiple of fluid-motors upon the shaft one for each clutch, conduits leading from the longitudinal bores formed within the shaft to the motors, a fluid-supply, and means for conducting the fluid to the several shaft-bores.

5. In a clutch mechanism, the combination with a shaft having a multiple of longitudinal bores formed therein, a multiple of members to be driven loosely sleeved upon the shaft, a clutch for each member, a multiple of fluid-motors upon the shaft one for each clutch, conduits leading from the longitudinal bores formed within the shaft to the motors, a fluid-supply means for conducting the fluid to the several shaft-bores, and a single actuating device for admitting the fluid into any one of the bores independent of the others.

6. In a clutch mechanism, the combination with the shaft having a longitudinal bore formed therein and extending through one end thereof, of the member to be driven, the clutch therefor and a fluid-motor for operating the clutch, all carried upon said shaft, a block adjacent to the shaft end having a port formed therein communicating with the shaft-bore, a cap covering the block and swiveled over said shaft end, a spring acting normally to separate the cap and block, a fluid-supply, a fluid-conduit leading from the supply to the cap and extending through the latter to the port in the block, and a conduit leading from the shaft-bore to the motor.

7. In a clutch mechanism, the combination with the shaft having a longitudinal bore formed therein and extending through one end thereof, of the member to be driven, the clutch therefor and a fluid-motor for operating the clutch, all carried upon said shaft, a cylindrical cap or coupling swiveled over the end of the shaft, a disk-shaped block within the coupling having an angular port formed therein, an apertured packing between the block and shaft end, a fluid-supply, a fluid-conduit leading from said supply to the periphery of the cap and extending through the latter to the port in the block, and conduit leading from the shaft-bore to the motor.

8. In a clutch mechanism, the combination with the shaft, a disk-shaped motor-support fixed thereto and having an elongated hub, a multiple of members to be driven loosely sleeved upon the hub, and a clutch for each of the members mounted upon and having a sliding engagement with said hub, a multiple of pneumatic piston-motors arranged upon the disk-shaped support, connections between the motors and the clutches, and means for independently operating the motors.

9. In a clutch mechanism, the combination with a shaft, a multiple of members to be driven loosely sleeved thereon, clutches for the members mounted upon the shaft for longitudinal movement, a disk fixed to the shaft, a multiple of fluid-motors for operating the clutches carried by the disk, operative connections between each of the motors and its respective clutch, a fluid-supply, a multiple of fluid-conduits leading from said supply to the several motors, and a single valve controlling the flow of the fluid through the conduits and constructed to admit the fluid to any one of the conduits independently of the others.

10. In a clutch mechanism, the combination with the shaft having a multiple of longitudinal bores formed therein and extending through one end, a multiple of members to be driven loosely sleeved thereon, a clutch for each member, a multiple of fluid-motors upon the shaft, one for each shaft, conduits leading from the several longitudinal bores to the motors, a coupler in the form of a cap swiveled over the end of the shaft through which the bores extend, a fluid-supply and a multiple of independent fluid-conduits leading from said supply to the coupling and communicating with the several shaft-bores, substantially as described.

In testimony whereof I affix my signature in presence of two witnesses.

RANSOM E. OLDS.

Witnesses:
M. B. O'DOGHERTY,
H. C. SMITH.